US012408109B1

(12) United States Patent
Yue et al.

(10) Patent No.: US 12,408,109 B1
(45) Date of Patent: Sep. 2, 2025

(54) RELAY COMMUNICATION POWER ALLOCATION METHOD AND SYSTEM DRIVEN BY MULTI-MICROGRID OPERATION SERVICES

(71) Applicant: NANJING UNIVERSITY OF POSTS AND TELECOMMUNICATIONS, Nanjing (CN)

(72) Inventors: Dong Yue, Nanjing (CN); Chaobin Song, Nanjing (CN); Bo Zhang, Nanjing (CN); Haiwen Wang, Nanjing (CN)

(73) Assignee: NANJING UNIVERSITY OF POSTS AND TELECOMMUNICATIONS, Nanjing (CN)

( * ) Notice: Subject to any disclaimer, the term of this patent is extended or adjusted under 35 U.S.C. 154(b) by 0 days.

(21) Appl. No.: 19/186,990

(22) Filed: Apr. 23, 2025

(30) Foreign Application Priority Data

Dec. 3, 2024 (CN) .......................... 202411755502.5

(51) Int. Cl.
*H04W 52/02* (2009.01)
*H04L 43/065* (2022.01)
(Continued)

(52) U.S. Cl.
CPC ....... *H04W 52/0203* (2013.01); *H04L 43/065* (2013.01); *H04L 43/0829* (2013.01);
(Continued)

(58) Field of Classification Search
None
See application file for complete search history.

(56) References Cited

U.S. PATENT DOCUMENTS 11,139,654 B2 * 10/2021 Ghotra .................... H02M 7/44
2014/0148960 A1 5/2014 Bhageria et al.
(Continued)

FOREIGN PATENT DOCUMENTS

CN 107147102 A 9/2017
KR 20240098584 A 6/2024

OTHER PUBLICATIONS

Dou et al., Multi-Agent System Based Decentralized Coordinated Control Strategy for Micro-grids, Transactions of China Electrotechnical Society, vol. 30, No. 7, pp. 125-134, dated Apr. 5, 2015.
(Continued)

*Primary Examiner* — Xavier S Wong
(74) *Attorney, Agent, or Firm* — Westbridge IP LLC

(57) ABSTRACT

Disclosed are a relay communication power allocation method driven by multi-microgrid operation services and a system thereof. The method includes the following steps: constructing a real transmission rate model of each microgrid gateway according to a cooperative relay working mode; constructing a data loss rate model of each microgrid gateway according to the real transmission rate model of each microgrid gateway; dividing the importance of each microgrid operation service according to the influence of each microgrid operation service on the power of the power grid; constructing a relay communication power optimization allocation model by using the importance of each microgrid operation service and the data loss rate model of each microgrid gateway; and solving the relay communication power optimization allocation model by using a successive convex approximation method to obtain the relay communication power optimization allocation result.

4 Claims, 3 Drawing Sheets

(51) Int. Cl.
*H04L 43/0829* (2022.01)
*H04W 52/24* (2009.01)
*G06Q 50/06* (2024.01)
*H02J 3/32* (2006.01)

(52) U.S. Cl.
CPC .......... *H04W 52/243* (2013.01); *G06Q 50/06* (2013.01); *H02J 3/322* (2020.01)

(56) References Cited

U.S. PATENT DOCUMENTS

| | | | |
|---|---|---|---|
| 2020/0119550 A1 | 4/2020 | Shuai et al. | |
| 2023/0068632 A1* | 3/2023 | Kudo | H02J 3/008 |
| 2023/0155390 A1* | 5/2023 | Chinthavali | H02J 1/14 307/52 |
| 2023/0369864 A1* | 11/2023 | Avery | H02J 13/00036 |

OTHER PUBLICATIONS

First Office Action issued in counterpart Chinese Patent Application No. 202411755502.5, dated Jan. 2, 2025.
Li, Research on Energy Optimization Management Scheme based on Deep Reinforcement Learning in Microgrid, Master's Thesis submitted to Nanjing University of Posts and Telecommunications, dated May 15, 2024.
Yue et al., Micro-grid Power Market Bidding System Based on Multi-agent Technology, 2018 5th IEEE International Conference on Cloud Computing and Intelligence Systems(CCIS), pp. 1033-1037, dated Apr. 14, 2019.
Yue et al., Source-Storage-Load Coordinated Master-Slave Control Strategy for Islanded Microgrid Considering Load Disturbance and Communication Interruption, IEEE Transactions on Cybernetics, pp. 1-14, dated Mar. 27, 2023.

* cited by examiner

RELAY COMMUNICATION POWER ALLOCATION METHOD AND SYSTEM DRIVEN BY MULTI-MICROGRID OPERATION SERVICES

CROSS-REFERENCE TO RELATED APPLICATIONS

The application claims priority to Chinese Patent Application No. 202411755502.5, filed on Dec. 3, 2024, which is incorporated herein by reference in its entirety.

TECHNICAL FIELD

The present disclosure relates to the technical field of microgrid control, and in particular to a relay communication power allocation method driven by multi-microgrid operation services and a system thereof.

BACKGROUND

The rapid development of population and economy in the world poses great challenges to energy demand and environmental protection. Therefore, more and more countries are gradually turning to renewable energy sources such as wind energy and solar energy, thus turning to Distributed Generation (DG). However, if DG is directly connected to the main power grid, the intermittent output of the DG may interfere with the performance of the main power grid. In order to reduce interference, the microgrid (MG) technology is developed. The microgrid is a small power system, which gathers distributed energy resources (DER) and loads in a local area. According to the specific characteristics of distributed energy resources and loads, the microgrid can be implemented and operated as all-alternating current (AC), all-direct current (DC) or hybrid AC/DC microgrid.

With the wide application of information and communication technology (ICT) in the field of the power system, the microgrid system has developed into a Cyber-Physical Power System (CPPS), in which the functions of information and power components are closely coupled in its operation. In addition, the ICT also promotes the formation of the multi-microgrid system. These microgrids can operate independently, and can also exchange energy and information through the network to achieve more efficient energy management and optimization. The operation of the multi-microgrid system relies more and more on the ICT to ensure the global observability and controllability of on-site resources. Recently, some advanced communication technologies have been applied to the multi-microgrid system. As a typical representative, the cooperative communication technology can effectively reduce the data loss rate of a communication network to improve the transmission quality.

In the multi-microgrid system, there are many related regulation services, such as voltage regulation, frequency regulation, demand response, etc. These services are generated at the control center, and are issued to all microgrids for execution by the control center, so as to regulate the physical system in real time, thus maintaining the safe and stable operation of the microgrid, providing users with a high-quality power supply, and providing reliable guarantee for the national economy while meeting the power demand of the users.

However, on the one hand, due to the different importance of multi-regulation services in the multi-microgrid (control services such as voltage regulation and frequency regulation are more important than economic services such as power consumption information acquisition and office automation), how to coordinate relay power allocation based on the service demand of different microgrids and provide appropriate relay power for services with different demands, so as to meet the transmission demand of the multi-microgrid service has become an urgent problem to be solved. On the other hand, the stability of the physical system and the quality of service of users depend on the real-time and accurate transmission of regulation instructions. Once there is a significant data loss in the service regulation instructions, resulting in the microgrid being unable to execute the service regulation instructions correctly, this will seriously affect the stability of the physical system and even cause loss to the national economy.

SUMMARY

The present disclosure aims to overcome the shortcomings in the prior art and provide a relay communication power allocation method driven by multi-microgrid operation services and a system thereof, which can solve the problem of relay power optimization allocation driven by a multi-microgrid service demand.

In order to achieve the above purpose, the present disclosure is realized by using the following technical scheme.

In a first aspect, the present disclosure provides a relay communication power allocation method driven by multi-microgrid operation services, including the following steps:

constructing a real transmission rate model of each microgrid gateway according to a cooperative relay working mode;

constructing a data loss rate model of each microgrid gateway according to the real transmission rate model of each microgrid gateway;

dividing the importance of each microgrid operation service according to the influence of each microgrid operation service on the power of the power grid;

constructing a relay communication power optimization allocation model by using the importance of each microgrid operation service and the data loss rate model of each microgrid gateway; and solving the relay communication power optimization allocation model by using a successive convex approximation method to obtain the relay communication power optimization allocation result.

Optionally, the cooperative relay working mode is a decode-and-forward working mode.

Optionally, the real transmission rate model of each microgrid gateway has a formula of:

$$R_i = \frac{W_i}{2} \ln\left(1 + \frac{p_i g_i^{cg}}{N_0 + I} + \frac{p_{r,i} g_i^{rg}}{N_0 + I}\right);$$

where $R_i$ denotes a real transmission rate model of an i-th microgrid gateway; $W_i$ denotes a channel bandwidth; $p_i$ denotes a transmission power from a control center to a relay and a transmission power from the control center to the i-th microgrid gateway; $p_{r,i}$ denotes a transmission power from the relay to the i-th microgrid gateway; $N_0$ denotes Gaussian noise of the channel; $I$ denotes interference; $g_i^{cg}$ denotes a channel gain from the control center to the i-th microgrid gateway; $g_i^{rg}$ denotes a channel gain from the relay to the i-th microgrid gateway.

Optionally, the data loss rate model of each microgrid gateway has a formula of:

$$D_i = \begin{cases} (\hat{R}_i - R_i)t, & \hat{R}_i > R_i \\ 0, & \hat{R}_i \leq R_i \end{cases};$$

where $D_i$ denotes a data loss rate model of the i-th microgrid gateway; $\hat{R}_i$ denotes an expected transmission rate of the i-th microgrid operation service; $R_i$ denotes a real transmission rate model of the i-th microgrid gateway; t denotes a sampling period.

Optionally, the importance of each microgrid operation service has a formula of:

$$w_i = \frac{P_i}{\min(P)};$$

where $w_i$ denotes an importance coefficient of the i-th microgrid operation service; $P_i$ denotes a power regulation amount of the power grid of the i-th microgrid operation service; P denotes a set of power regulation amounts of the power grid of the microgrid operation service.

Optionally, the relay communication power optimization allocation model has a formula of:

$$\min \sum_{i=1}^{n} w_i D_i = \min \sum_{i=1}^{n} w_i \left( \hat{R}_i - \frac{W_i}{2} \ln\left(1 + \frac{p_i g_i^{cg}}{N_0 + I} + \frac{p_{r,i} g_i^{rg}}{N_0 + I}\right) \right) t;$$

the constraints are:

$$\sum_{i=1}^{n} p_{r,i} \leq p_{max};$$

$$p_{r,i} \leq \frac{p_i(g_i^{cr} - g_i^{cg})}{g_i^{rg}};$$

where $w_i$ denotes an importance coefficient of the i-th microgrid operation service; $D_i$ denotes a data loss rate model of the i-th microgrid gateway; n denotes the number of the microgrid operation services; $\hat{R}_i$ denotes an expected transmission rate of the i-th microgrid operation service; $p_i$ denotes a transmission power from the control center to the relay and a transmission power from the control center to the i-th microgrid gateway; $p_{r,i}$ denotes a transmission power from the relay to the i-th microgrid gateway; $N_0$ denotes Gaussian noise of the channel; I denotes interference; $g_i^{cp}$ denotes a channel gain from the control center to the i-th microgrid gateway; $g_i^{rp}$ denotes a channel gain from the relay to the i-th microgrid gateway; t denotes a sampling period; $p_{max}$ denotes a total power that the relay uses for allocation; $g_i^{cr}$ denotes a channel gain from the control center to the relay.

Optionally, solving the relay communication power optimization allocation model by using the successive convex approximation method to obtain the relay communication power optimization allocation result includes:

in the successive convex approximation method, denoting a lower bound approximation of a logarithmic function as:

$$\alpha \log x + \beta \leq \log(1+x), \forall x > 0;$$

when:

$$\begin{cases} \alpha = \frac{x_0}{1+x_0} \\ \beta = \log(1+x_0) - \frac{x_0}{1+x_0} \log(x_0) \end{cases};$$

transforming the relay communication power optimization allocation model into:

$$\min \sum_{i=1}^{n} w_i \left( \hat{R}_i - \frac{W_i \ln 10}{2} (\alpha_i \log \mathrm{SINR}_i(e^{\tilde{p}_{r,i}}) + \beta_i) \right)$$

$$\text{s.t. } \sum_{i=1}^{n} e^{\tilde{p}_{r,i}} \leq p_{max}$$

$$e^{\tilde{p}_{r,i}} \leq \frac{p_i(g_i^{cr} - g_i^{cg})}{g_i^{rg}};$$

using a solver to solve the transformed relay communication power optimization allocation model to obtain the relay communication power optimization allocation result;

where α denotes a first coefficient; β denotes a second coefficient; x denotes an independent variable; $x_0$ denotes an optimal solution of the independent variable; $\alpha_i$ denotes a first coefficient of the i-th microgrid gateway; $\beta_i$ denotes a second coefficient of the i-th microgrid gateway; $\tilde{p}_{r,i}$ denotes a transformed transmission power from the relay to the i-th microgrid gateway; $\mathrm{SINR}_i(e^{\tilde{p}_{r,i}})$ denotes the transformed signal interference plus noise ratio from the relay to the i-th microgrid gateway.

In a second aspect, the present disclosure provides a relay communication power allocation system driven by multi-microgrid operation services, including:

a real transmission rate model constructing module, which is configured to construct a real transmission rate model of each microgrid gateway according to a cooperative relay working mode;

a service data loss rate model constructing module, which is configured to construct constructing a data loss rate model of each microgrid gateway according to the real transmission rate model of each microgrid gateway;

a service importance dividing module, which is configured to divide the importance of each microgrid operation service according to the influence of each microgrid operation service on the power of the power grid;

a relay communication power optimization allocation model constructing module, which is configured to construct a relay communication power optimization allocation model by using the importance of each microgrid operation service and the data loss rate model of each microgrid gateway; and a relay communication power optimization allocation model solving module, which is configured to solve the relay communication power optimization allocation model by using a successive convex approximation method to obtain the relay communication power optimization allocation result.

In a third aspect, the present disclosure provides a computer-readable storage medium, on which a computer instruction are stored, where the computer instruction, when executed by a processor, implements the steps of the relay communication power allocation method driven by the multi-microgrid operation services described in the first aspect.

In a fourth aspect, the present disclosure provides a computer device, including:

a memory, in which a computer instruction is stored;

a processor, which is configured to execute the computer instruction to implement the steps of the relay communication power allocation method driven by the multi-microgrid operation services described in the first aspect.

Compared with the prior art, the present disclosure has the following beneficial effects.

According to the present disclosure, the importance of the microgrid service is divided according to the influence of each microgrid service on the power grid. The relay communication power is allocated according to the importance of the microgrid service, thus solving the problem that the traditional power optimization allocation ignores the power grid service demand. The successive convex approximation method is used to transform the original optimization problem, which solves the problem that the power optimization allocation is not convex and cannot be directly solved, and at the same time ensures the reliable transmission of important services without data loss, thus solving the problem of data loss in important service transmission.

DETAILED DESCRIPTION OF THE EMBODIMENTS

The technical scheme of the present disclosure will be described in detail with reference to the attached drawings and the detailed description hereinafter. It should be understood that the embodiments of the present disclosure and the specific features in the embodiments are detailed descriptions of the technical scheme of the present disclosure, rather than limitations on the technical scheme of the present disclosure. In case of no conflict, the embodiments of the present disclosure and the technical features in the embodiments can be combined with each other.

The term "and/or" is merely used to describe the associative relationship of associated objects, which indicates that there can be three relationships. For example, A and/or B can indicate that A exists alone, A and B exist at the same time, and B exists alone. In addition, the character "/" generally indicates that the context associated objects form an "OR" relationship.

Embodiment 1

Figure 1:
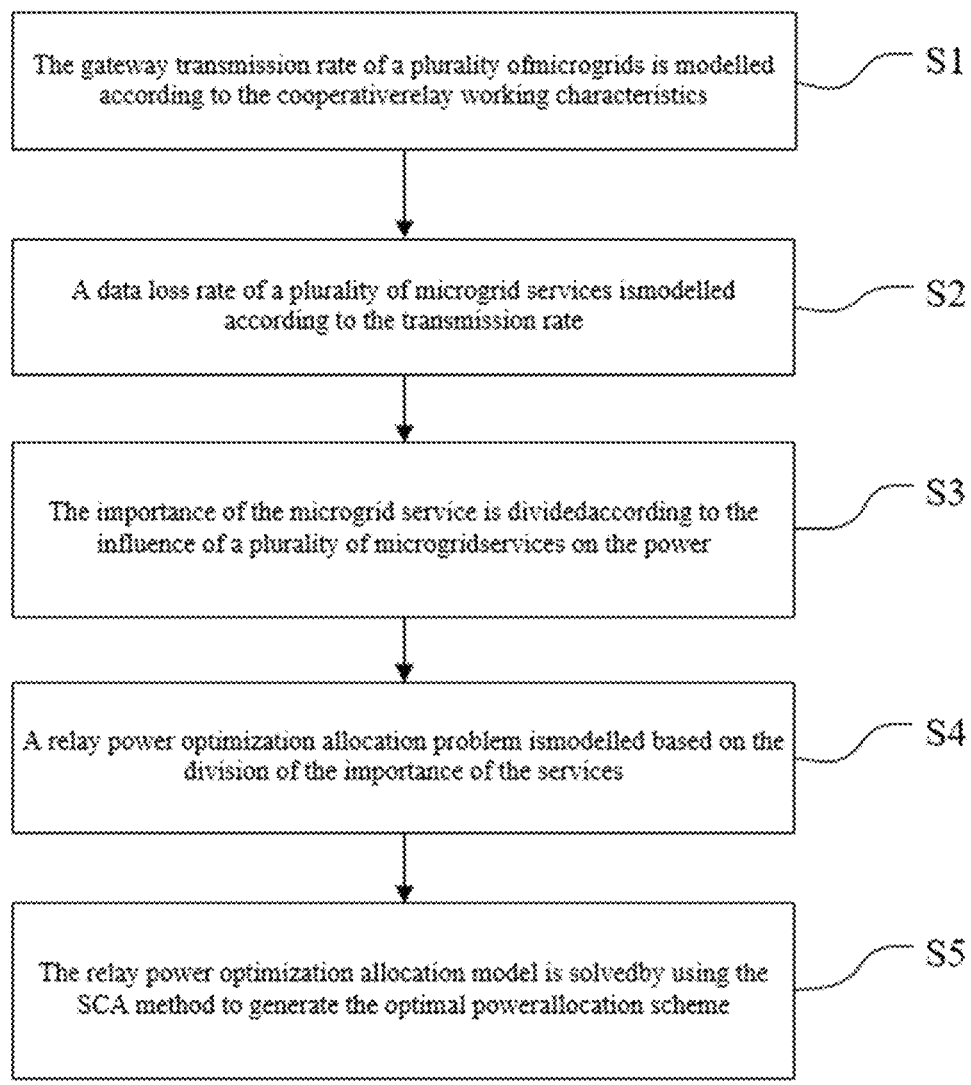
FIG. 1 is a schematic flow chart of a relay communication power allocation method driven by multi-microgrid operation services according to an embodiment of the present disclosure.
Figure 2:
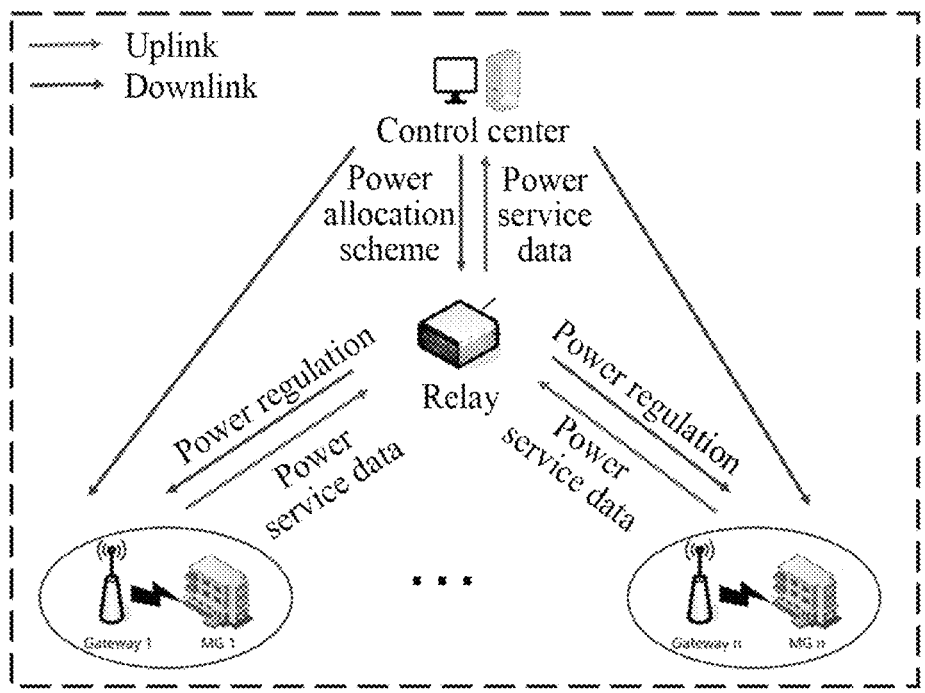
FIG. 2 is a schematic diagram of a multi-microgrid cooperative communication scenario according to an embodiment of the present disclosure.

As shown in FIG. 1, this embodiment introduces a relay communication power allocation method driven by a multi-microgrid operation service. The scenario diagram of a multi-microgrid cooperative communication field is shown in FIG. 2, including a top control center, a middle cooperative relay and a plurality of bottom microgrids. The control center acquires the service demand from the microgrid and the channel state information and generates the optimal relay power allocation scheme.

The method specifically includes the following steps.

S1, a real transmission rate model of each microgrid gateway is constructed according to a cooperative relay working mode specifically as follows.

The control center acquires the channel state information of the cooperative relay, and constructs the real transmission rate model of a plurality of microgrid gateways. In order to improve the real transmission rate of the microgrid gateways, the Decode-and-Forward (DF) working mode in the Cooperative Relay (CR) scenario is used, which includes two time slots.

In the first time slot, the control center sends signals to the microgrid gateway and the relay. In the second time slot, the relay decodes the signal from the control center and retransmits the signal to the microgrid gateway, and then the microgrid gateway merges the signals from the control center and the relay. Therefore, the theoretical maximum transmission rate $C_i$ that the i-th microgrid gateway can reach can be expressed as:

$$C_i = \min\left\{ \frac{W_i}{2}\log_2\left(1 + \frac{p_i g_i^{cg}}{N_0 + I} + \frac{p_{r,i} g_i^{rg}}{N_0 + I}\right), \frac{W_i}{2}\log_2\left(1 + \frac{p_i g_i^{cr}}{N_0 + I}\right) \right\} \quad (1)$$

where $W_i$ denotes a channel bandwidth; $p_i$ denotes a transmission power from a control center to a relay and a transmission power from the control center to the i-th microgrid gateway; $p_{r,i}$ denotes a transmission power from the relay to the i-th microgrid gateway; $N_0$ denotes Gaussian noise of the channel; I denotes interference; $g_i^{cp}$ denotes a channel gain from the control center to the i-th microgrid gateway; $g_i^{rg}$ denotes a channel gain from the relay to the i-th microgrid gateway; $g_i^{cr}$ denotes a channel gain from the control center to the relay.

Due to interference and fading in the real channel, there is a deviation between the real transmission rate $R_i$ and the theoretical maximum transmission rate $C_i$ of the i-th microgrid gateway. It is assumed that the deviation therebetween is expressed as:

$$R_i = \tau C_i \quad (2)$$

where $\tau$ is a constant, in which $\tau = \ln 2$, and then the real transmission rate model $R_i$ of the i-th microgrid gateway can be written as:

$$R_i = \min\left\{\frac{W_i}{2}\ln\left(1 + \frac{p_i g_i^{cg}}{N_0 + I} + \frac{p_{r,i} g_i^{rg}}{N_0 + I}\right),\right. \quad (3)$$

$$\left.\frac{W_i}{2}\log_2\left(1 + \frac{p_i g_i^{cr}}{N_0 + I}\right)\right\}$$

In order to decode the signal reliably at the relay, the transmission rate of the relay-assisted microgrid gateway should be less than the transmission rate from the control center to the relay, that is:

$$\ln\left(1 + \frac{p_i g_i^{cg}}{N_0 + I} + \frac{p_{r,i} g_i^{rg}}{N_0 + I}\right) \le \ln\left(1 + \frac{p_i g_i^{cr}}{N_0 + I}\right) \quad (4)$$

To sum up, in the Cooperative Relay (CR) scenario based on the Decode-and-Forward (DF) mode, the real transmission rate $R_i$ model of the i-th microgrid gateway is finally expressed as:

$$R_i = \frac{W_i}{2}\ln\left(1 + \frac{p_i g_i^{cg}}{N_0 + I} + \frac{p_{r,i} g_i^{rg}}{N_0 + I}\right) \quad (5)$$

S2, a data loss rate model of each microgrid gateway is constructed according to the real transmission rate model of each microgrid gateway specifically as follows.

The data loss can be defined as the deviation between the expected transmission rate $\hat{R}_i$ of the microgrid operation service and the real transmission rate $R_i$ of the microgrid gateway in a sampling period, which is expressed as:

$$D_i = \begin{cases}(\hat{R}_i - R_i)t, & \hat{R}_i > R_i \\ 0, & \hat{R}_i \le R_i\end{cases} \quad (6)$$

where t denotes a sampling period.

S3, the control center divides the importance of each microgrid operation service according to the influence of each microgrid operation service on the power of the power grid specifically as follows.

Considering that most of the services in the power grid are related to the regulation of the power flow of the power grid, the importance of microgrid services is mapped to the power regulation amount of the power grid of the service, and the importance of the microgrid service is divided according to the relative size of the power regulation amount of the service to obtain the importance coefficient $w_i$, which is expressed as:

$$w_i = \frac{P_i}{\min(P)};$$

where $w_i$ denotes an importance coefficient of the i-th microgrid operation service; $P_i$ denotes a power regulation amount of the power grid of the i-th microgrid operation service; P denotes a set of power regulation amounts of the power grid of the microgrid operation service, $P=[P_1, \ldots, P_n]$.

S4, a relay communication power optimization allocation model is constructed by using the importance of each microgrid operation service and the data loss rate model of each microgrid gateway, and taking the minimization of the data loss rate of all microgrid gateways as the objective and taking the total relay power limit and the decode-and-forward power limit as constraints, the objective function is expressed as:

$$\min \sum_{i=1}^{n} w_i D_i \quad (8)$$

By substituting formulas (5) and (6) into formula (8), the objective function can be rewritten as:

$$\min \sum_{i=1}^{n} w_i\left(\hat{R}_i - \frac{W_i}{2}\ln\left(1 + \frac{p_i g_i^{cg}}{N_0 + I} + \frac{p_{r,i} g_i^{rg}}{N_0 + I}\right)\right)t \quad (9)$$

The total relay power constraint can be expressed as:

$$\sum_{i=1}^{n} p_{r,i} \le p_{max} \quad (10)$$

where $p_{max}$ denotes a total power that the relay uses for allocation, and the constraint (10) requires that the power allocated by the relay to n microgrid gateways cannot exceed its maximum allowable power.

The decode-and-forward power constraint can be expressed as:

$$p_{r,i} \le \frac{p_i(g_i^{cr} - g_i^{cg})}{g_i^{rg}} \quad (11)$$

The constraint (11) requires that the transmission rate of the relay-assisted microgrid gateway should be less than the transmission rate from the control center to the relay, thus ensuring that the signal is decoded reliably at the relay.

S5, the relay communication power optimization allocation model is solved by using a continuous convex approximation method to obtain the relay communication power optimization allocation result. That is, convex approximation transformation is performed on the relay communication power optimization allocation model by using the Successive Convex Approximation (SCA) method, and the transformed optimization problem is solved to generate the optimal relay communication power allocation scheme specifically as follows.

In the successive convex approximation (SCA) method, the lower bound approximation of the logarithmic function log(1+x) can be expressed as:

$$\alpha \log x + \beta \le \log(1+x), \forall x > 0 \quad (12)$$

where $\alpha$ and $\beta$ are two positive coefficients.

The objective function is optimized by adjusting the independent variable x. $x_0$ is the optimal solution of the transformation problem. The values of $\alpha$ and $\beta$ need to be determined, where $\alpha \ge 0$. x is equal to $x_0$, which is substituted into (12) to obtain:

$$\left(\frac{x}{x_0}\right)^\alpha \le \frac{1+x}{1+x_0} \quad (13)$$

According to formula (13), it can be known that:
A, all effective coefficients satisfy (13);
B, when $$\alpha \geq 1, \left(\frac{x}{x_0}\right)^\alpha$$

is a convex function;
C, when $$x = x_0, \left(\frac{x}{x_0}\right)^{\frac{x}{1+x_0}}$$

is the tangent of $$\frac{1+x}{1+x_0}.$$

It can be concluded from the above that $$\alpha = \frac{x_0}{1+x_0}$$

is the maximum value satisfying (13). Therefore, the factors are selected as follows:

$$\begin{cases} \alpha = \frac{x_0}{1+x_0} \\ \beta = \log(1+x_0) - \frac{x_0}{1+x_0}\log(x_0) \end{cases} \quad (14)$$

(14) is substituted into the objective function (9) to obtain:

$$\sum_{i=1}^{n} w_i \left( \hat{R}_i - \frac{W_i \ln 10}{2} (\alpha_i \log \text{SINR}_i(p_{r,i}) + \beta_i) \right) \quad (15)$$

where if $$\text{SINR}_i(p_{r,i}) = \frac{p_i g_i^{cg} + p_{r,i} g_i^{rg}}{N_0 + I}.$$

It is assumed that $\tilde{p}_{r,i} = \ln p_{,i}$, that is, $e^{\tilde{p}_{r,i}} = p_{r,i}$. This transformation is used to transform the original non-convex problem into a convex problem, thereby facilitating the solution process. The original optimization problems (9) to (11) can be rewritten to obtain the transformed relay communication power optimization allocation model, which is expressed as:

$$\min \sum_{i=1}^{n} w_i \left( \hat{R}_i - \frac{W_i \ln 10}{2} (\alpha_i \log \text{SINR}_i(e^{\tilde{p}_{r,i}}) + \beta_i) \right) \quad (16)$$

$$\text{s.t.} \sum_{i=1}^{n} e^{\tilde{p}_{r,i}} \leq p_{max}$$

$$e^{\tilde{p}_{r,i}} \leq \frac{p_i(g_i^{cr} - g_i^{cg})}{g_i^{rg}}$$

where $\alpha$ denotes a first coefficient; $\beta$ denotes a second coefficient; $\alpha_i$ denotes a first coefficient of the i-th microgrid gateway; $\beta_i$ denotes a second coefficient of the i-th microgrid gateway; $\text{SINR}_i(e^{\tilde{p}_{r,i}})$ denotes the transformed signal interference plus noise ratio from the relay to the i-th microgrid gateway; $\tilde{p}_{r,i}$ denotes a transformed transmission power from the relay to the i-th microgrid gateway.

The convex optimization problem (16) can be solved by solver to obtain the relay communication power optimization allocation result. The solver may be a common commercial solver.

Embodiment 2

As shown in FIG. 2, this embodiment introduces a relay communication power allocation system driven by a multi-microgrid operation service, including:

a real transmission rate model constructing module, which is configured to construct a real transmission rate model of each microgrid gateway according to a cooperative relay working mode;

a service data loss rate model constructing module, which is configured to construct constructing a data loss rate model of each microgrid gateway according to the real transmission rate model of each microgrid gateway;

a service importance dividing module, which is configured to divide the importance of each microgrid operation service according to the influence of each microgrid operation service on the power of the power grid;

a relay communication power optimization allocation model constructing module, which is configured to construct a relay communication power optimization allocation model by using the importance of each microgrid operation service and the data loss rate model of each microgrid gateway; and a relay communication power optimization allocation model solving module, which is configured to solve the relay communication power optimization allocation model by using a successive convex approximation method to obtain the relay communication power optimization allocation result.

Embodiment 3

This embodiment introduces a specific experimental design of relay communication power allocation driven by multi-microgrid operation services, including the following steps.

According to the scenario shown in FIG. 1, the relay communication power allocation simulation is carried out. In this embodiment, there is a control center, a relay and three microgrids (MG1, MG2, MG3). According to different service demands of the three microgrids, the control center adjusts the transmission power of the relay to different microgrids through the relay communication power allocation method of this embodiment.

In this embodiment, the service importance is set as MG1>MG2>MG3. Assuming that the relay power resources are limited, it is not enough to support the transmission of all services without data loss. Table 1 shows the comparison of relay communication power allocation results under three methods: a relay power averaging method (avg), a method for optimizing relay power without service importance (no imp) and a relay communication power allocation method (imp) in this embodiment.

TABLE 1

Comparison of the results of three
relay power allocation methods

|  | imp | no imp | avg |
|---|---|---|---|
| pr1 | 30 | 21.25 | 16.67 |
| pr2 | 15 | 15 | 15 |
| pr3 | 5 | 13.75 | 15 |
| R1 | 10126.67 | 9934.31 | 9816.62 |
| R2 | 10126.67 | 10126.67 | 10126.67 |
| R3 | 9615.87 | 10075.37 | 10126.67 |
| data_loss1 | 0 | 65.69 | 183.38 |
| data_loss2 | 0 | 0 | 0 |
| data_loss3 | 34.13 | 0 | 0 |

Figure 3:
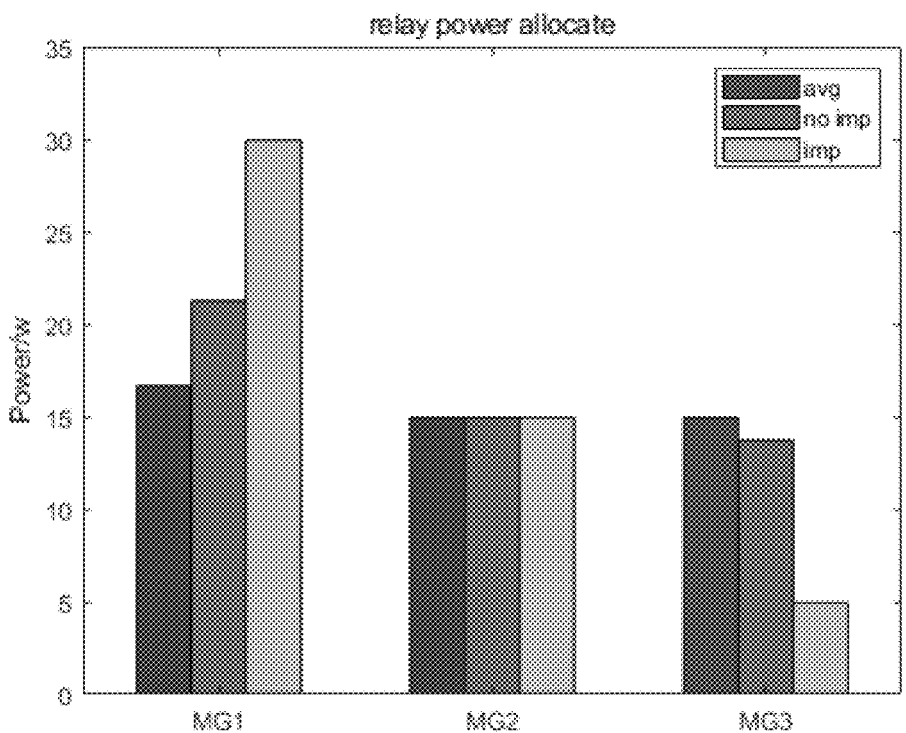
FIG. 3 is a comparison diagram of relay communication power allocation results between the method according to an embodiment of the present disclosure and the existing method.
Figure 4:
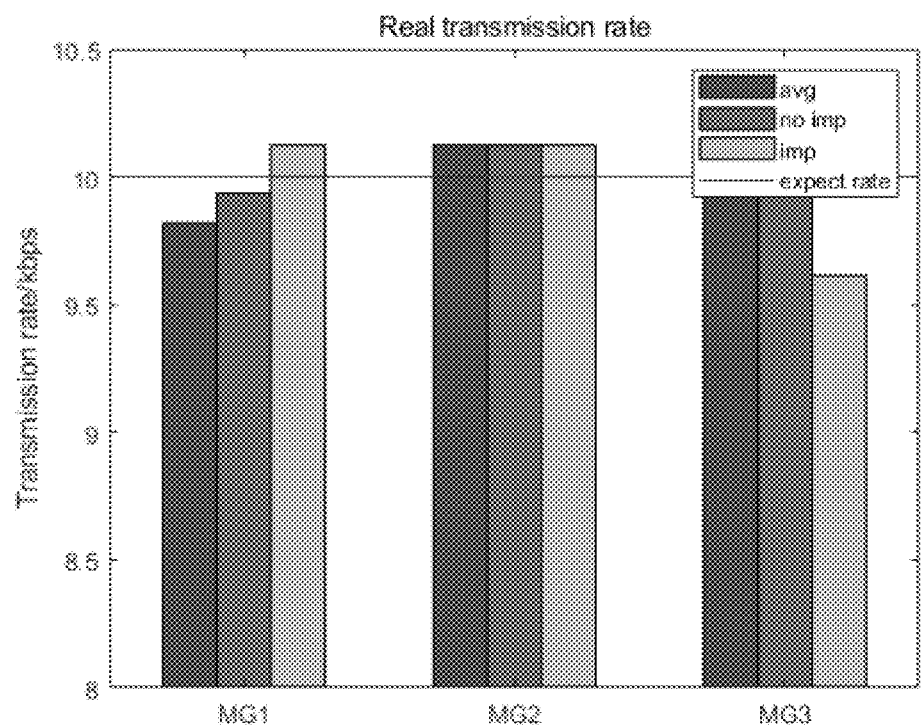
FIG. 4 is a comparison diagram of multi-microgrid real-time transmission rate results between the method according to an embodiment of the present disclosure and the existing method.
Figure 5:
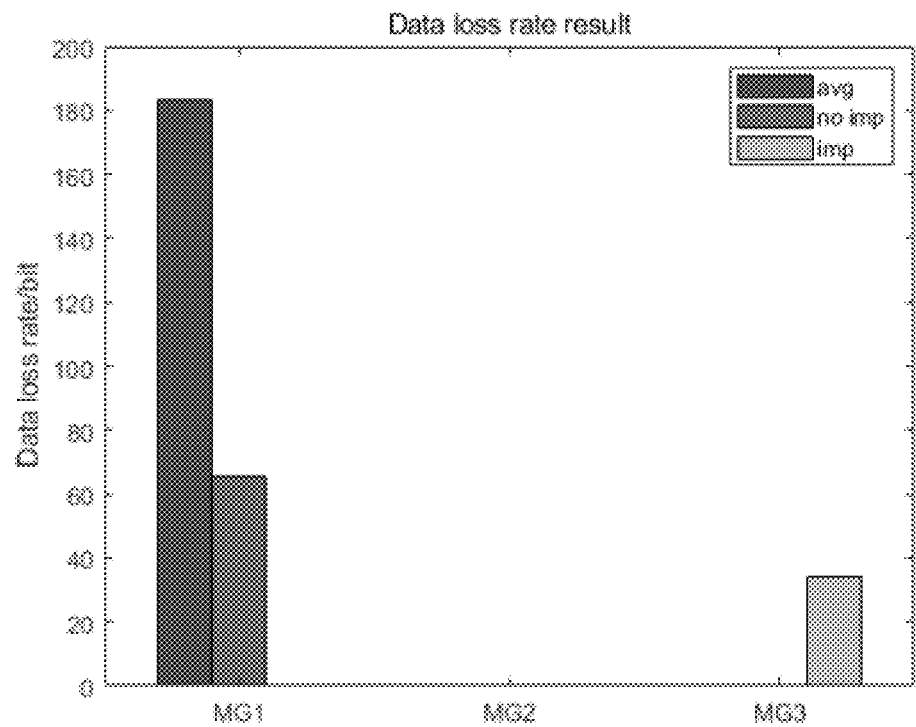
FIG. 5 is a comparison diagram of data loss rate results of multi-microgrid data between the method according to an embodiment of the present disclosure and the existing method.

FIG. 3, FIG. 4 and FIG. 5 are data simulation results of the relay communication power allocation scheme, the data transmission rate and the data loss rate of MG1, MG2 and MG3.

With reference to the data results in Table 1 and FIG. 3, it can be seen that the relay power obtained by the three microgrids under avg method is roughly the same; the relay power obtained by MG1 under no imp method is greater than that of MG2 and MG3, but there is little difference between MG2 and MG3. The relay power obtained by MG1 under imp method is much greater than that of MG2 and MG3, and the power of MG2 is also significantly greater than that of MG3. It shows that the imp method of this embodiment can optimize and allocate relay communication power according to the importance of different microgrid services.

It can be seen from Table 1 and FIG. 4 that the transmission rate of MG1 (important service) under avg method is lower than that of the other two microgrids. The no imp method partially optimizes the relay power, so that the transmission rate of MG1 increases, but it is still lower than the expected rate. The imp method in this embodiment can allocate power according to the service importance, so that the transmission rate of MG1 reaches the expected value. It shows that the imp method of this embodiment can ensure the transmission rate of important services and reduce loss by sacrificing the transmission rate of unimportant services in the scenario of limited resources.

With reference to Table 1 and FIG. 5, it can be seen that under the avg method, there is a large amount of data loss in the MG1 service, but there is no data loss in the services of the other two microgrids. The no imp method reduces the data loss rate of MG1, but it is still impossible to guarantee the reliable transmission of important services MG1 without data loss. The imp method in this embodiment achieves transmission of the MG1 service without data loss by sacrificing the transmission quality of the unimportant service MG3, thus reducing the loss of the power grid.

It should be understood by those skilled in the art that the embodiments of the present disclosure can be provided as a method, a system or a computer program product. Therefore, the present disclosure can take the form of an entirely hardware embodiment, an entirely software embodiment or an embodiment combining software and hardware aspects. Furthermore, the present disclosure may take the form of a computer program product implemented on one or more computer usable storage media (including but not limited to a disk storage, a CD-ROM, an optical storage, etc.) in which computer usable program codes are included.

The present disclosure is described with reference to flow charts and/or block diagrams of methods, devices (systems) and computer program products according to embodiments of the present disclosure. It should be understood that each flow and/or block in the flow chart and/or block diagram and combinations of the flow and/or block in the flow chart and/or block diagram can be implemented by computer program instructions. These computer program instructions may be provided to a processor of a general-purpose computer, a special-purpose computer, an embedded processor or other programmable data processing devices to produce a machine, such that the instructions which are executed by the processor of the computer or other programmable data processing devices produce means for implementing the functions specified in one or more flow in the flow chart and/or one or more blocks in the block diagram.

These computer program instructions may also be stored in a computer-readable memory that can direct a computer or other programmable data processing devices to function in a particular manner, such that the instructions stored in the computer-readable memory produce an article of manufacture including instruction means that implement the functions specified in one or more flow in the flow chart and/or one or more blocks in the block diagram.

These computer program instructions may also be loaded onto a computer or other programmable data processing devices, such that a series of operational steps are executed on the computer or other programmable devices to produce a computer-implemented process, such that the instructions executed on the computer or other programmable devices provide steps for implementing the functions specified in one or more flow in the flow chart and/or one or more blocks in the block diagram.

The embodiments of the present disclosure have been described above with reference to the attached drawings, but the present disclosure is not limited to the above detailed description. The above detailed description are only schematic, rather than restrictive. Those skilled in the art may make various modifications inspired by the present disclosure without departing from the spirit of the present disclosure and the scope defined by the claims. All such modifications shall fall within the scope of protection of the present disclosure.

What is claimed is:

1. A relay communication power allocation method driven by multi-microgrid operation services, comprising the following steps:

constructing a real transmission rate model of each microgrid gateway according to a cooperative relay working mode;

constructing a data loss rate model of each microgrid gateway according to the real transmission rate model of each microgrid gateway;

dividing the importance of each microgrid operation service according to the influence of each microgrid operation service on the power of the power grid;

constructing a relay communication power optimization allocation model by using the importance of each microgrid operation service and the data loss rate model of each microgrid gateway; and solving the relay communication power optimization allocation model by using a successive convex approximation method to obtain the relay communication power optimization allocation result;

wherein the cooperative relay working mode is a decode-and-forward working mode;

the real transmission rate model of each microgrid gateway has a formula of:

$$R_i = \frac{W_i}{2}\ln\left(1 + \frac{p_i g_i^{cg}}{N_0 + I} + \frac{p_{r,i} g_i^{rg}}{N_0 + I}\right);$$

where $R_i$ denotes a real transmission rate model of an i-th microgrid gateway; $W_i$ denotes a channel bandwidth; $p_i$ denotes a transmission power from a control center to a relay and a transmission power from the control center to the i-th microgrid gateway; $p_{r,i}$ denotes a transmission power from the relay to the i-th microgrid gateway; $N_0$ denotes Gaussian noise of the channel; I denotes interference; $g_i^{cg}$ denotes a channel gain from the control center to the i-th microgrid gateway; $g_i^{rg}$ denotes a channel gain from the relay to the i-th microgrid gateway;

the data loss rate model of each microgrid gateway has a formula of:

$$D_i = \begin{cases}(\hat{R}_i - R_i)t, & \hat{R}_i > R_i \\ 0, & \hat{R}_i \le R_i\end{cases};$$

where $D_i$ denotes a data loss rate model of the i-th microgrid gateway; $\hat{R}_i$ denotes an expected transmission rate of the i-th microgrid operation service; $R_i$ denotes a real transmission rate model of the i-th microgrid gateway; t denotes a sampling period;

the importance of each microgrid operation service has a formula of:

$$w_i = \frac{P_i}{\min(P)};$$

where $w_i$ denotes an importance coefficient of the i-th microgrid operation service; $P_i$ denotes a power regulation amount of the power grid of the i-th microgrid operation service; P denotes a set of power regulation amounts of the power grid of the microgrid operation service;

the relay communication power optimization allocation model has a formula of:

$$\min\sum_{i=1}^{n} w_i D_i j = \min\sum_{i=1}^{n} w_i\left(\hat{R}_i - \frac{W_i}{2}\ln\left(1 + \frac{p_i g_i^{cg}}{N_0 + I} + \frac{p_{r,i} g_i^{rg}}{N_0 + I}\right)\right)t;$$

the constraints are:

$$\sum_{i=1}^{n} p_{r,i} \le p_{max};$$

$$p_{r,i} \le \frac{p_i(g_i^{cr} - g_i^{cg})}{g_i^{rg}};$$

where $w_i$ denotes an importance coefficient of the i-th microgrid operation service; $D_i$ denotes a data loss rate model of the i-th microgrid gateway; n denotes the number of the microgrid operation services; $\hat{R}_i$ denotes an expected transmission rate of the i-th microgrid operation service; $p_i$ denotes a transmission power from the control center to the relay and a transmission power from the control center to the i-th microgrid gateway; $p_{r,i}$ denotes a transmission power from the relay to the i-th microgrid gateway; $N_0$ denotes Gaussian noise of the channel; I denotes interference; $g_i^{cg}$ denotes a channel gain from the control center to the i-th microgrid gateway; $g_i^{rg}$ denotes a channel gain from the relay to the i-th microgrid gateway; t denotes a sampling period; $p_{max}$ denotes a total power that the relay uses for allocation; $g_i^{cr}$ denotes a channel gain from the control center to the relay.

2. The relay communication power allocation method driven by the multi-microgrid operation services according to claim 1, wherein solving the relay communication power optimization allocation model by using the successive convex approximation method to obtain the relay communication power optimization allocation result comprises:

in the successive convex approximation method, denoting a lower bound approximation of a logarithmic function as:

$$\alpha\log x + \beta \le \log(1+x), \forall x > 0;$$

when:

$$\begin{cases}\alpha = \dfrac{x_0}{1 + x_0} \\ \beta = \log(1 + x_0) - \dfrac{x_0}{1 + x_0}\log(x_0)\end{cases};$$

transforming the relay communication power optimization allocation model into:

$$\min\sum_{i=1}^{n} w_i\left(\hat{R}_i - \frac{W_i \ln 10}{2}(\alpha_i \log \mathrm{SINR}_i(e^{\tilde{p}_{r,i}}) + \beta_i)\right)$$

$$\text{s.t.} \sum_{i=1}^{n} e^{\tilde{p}_{r,i}} \le p_{max}$$

$$e^{\tilde{p}_{r,i}} \le \frac{p_i(g_i^{cr} - g_i^{cg})}{g_i^{rg}};$$

using a solver to solve the transformed relay communication power optimization allocation model to obtain the relay communication power optimization allocation result;

where $\alpha$ denotes a first coefficient; $\beta$ denotes a second coefficient; x denotes an independent variable; $x_0$ denotes an optimal solution of the independent variable; $\alpha_i$ denotes a first coefficient of the i-th microgrid gateway; $\beta_i$ denotes a second coefficient of the i-th microgrid gateway; $\tilde{p}_{r,i}$ denotes a transformed transmission power from the relay to the i-th microgrid gateway; $\mathrm{SINR}_i(e^{\tilde{p}_{r,i}})$ denotes the transformed signal interference plus noise ratio from the relay to the i-th microgrid gateway.

3. A non-transitory computer-readable storage medium, on which a computer instruction is stored, wherein the computer instruction, when executed by a processor, implements the steps of the relay communication power allocation method driven by the multi-microgrid operation services according to claim 1.

4. A computer device, comprising:

a memory, in which a computer instruction is stored;

a processor, which is configured to execute the computer instruction to implement the steps of the relay communication power allocation method driven by the multi-microgrid operation services according to claim 1.

* * * * *